UNITED STATES PATENT OFFICE.

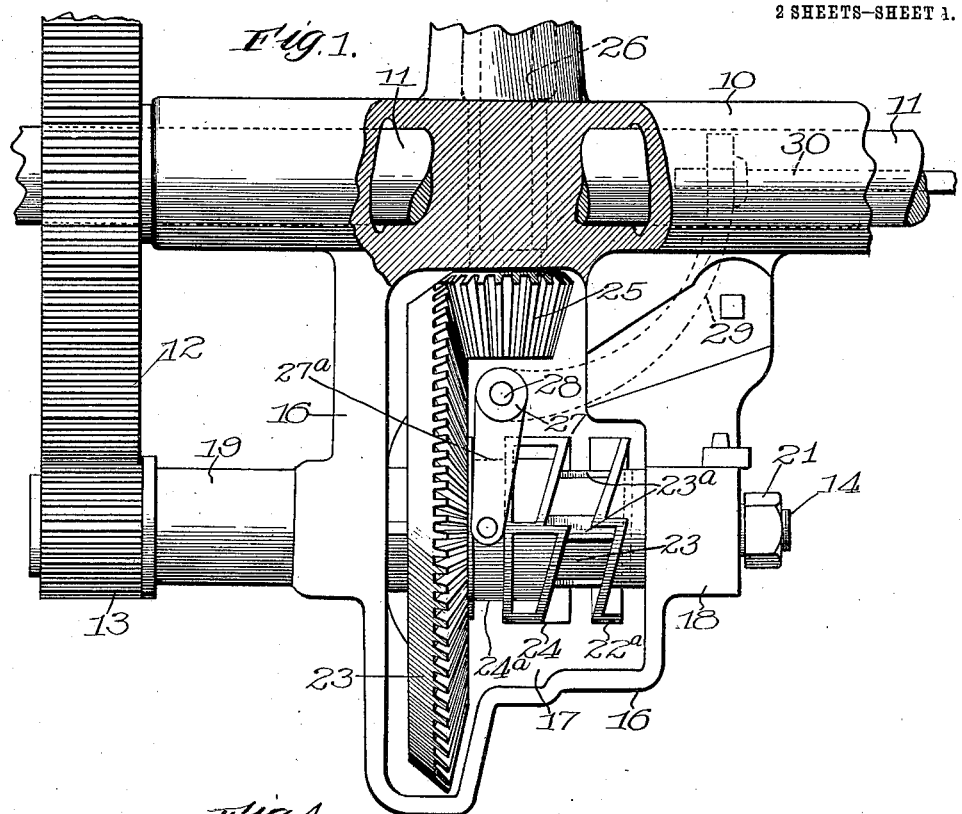
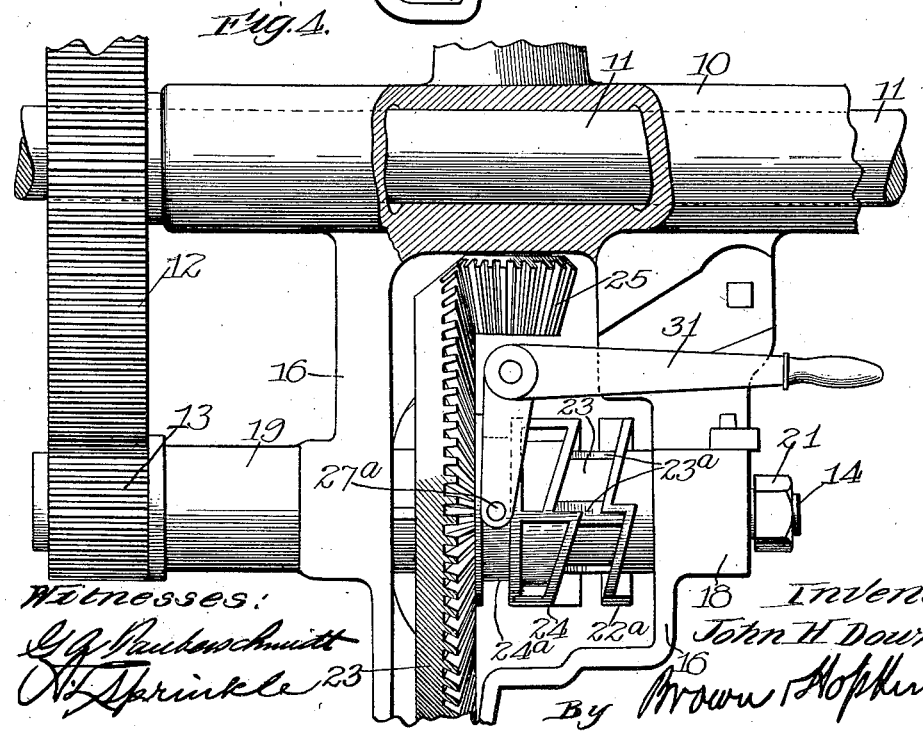

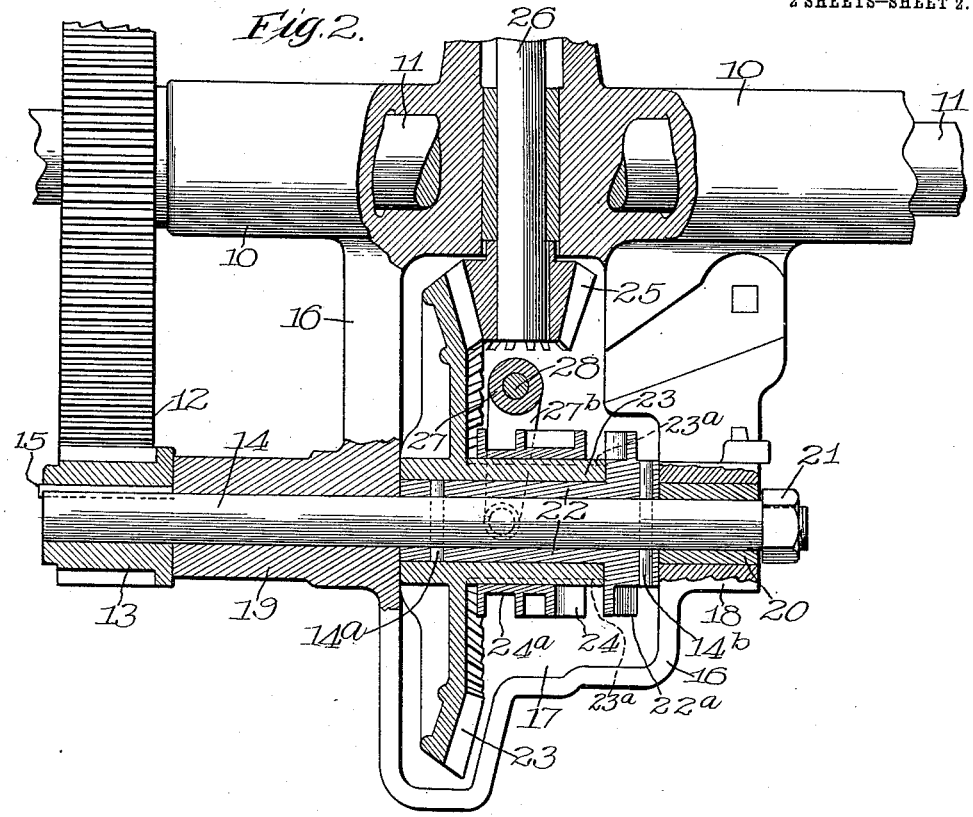
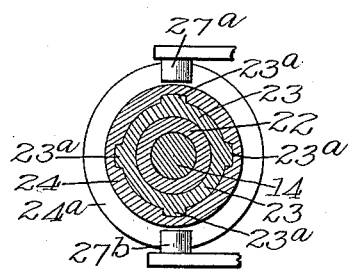

JOHN H. DOWNING, OF STILLWATER, MINNESOTA, ASSIGNOR TO THE STATE OF MINNESOTA.

GEARING.

1,008,451.  Specification of Letters Patent.  Patented Nov. 14, 1911.

Application filed May 6, 1911. Serial No. 625,591.

*To all whom it may concern:*

Be it known that I, JOHN H. DOWNING, a subject of the King of England, residing at Stillwater, in the county of Washington and State of Minnesota, have invented certain new and useful Improvements in Driving-Gearing for Harvesting-Machines, of which the following is a specification.

The invention relates to driving gears for harvesting machines and more particularly to driving gears used on machines for mowing grass, and has for its primary object to provide an improved driving gear which is simple in construction and efficient in operation, and which at the same time may be constructed economically and be easily assembled.

To the attainment of these ends and to accomplish certain other new and useful objects, the invention consists in the features of novelty hereinafter described, shown in the accompanying drawings forming a part of the specification and finally pointed out more particularly in the appended claims.

In the said drawings, Figure 1 is a plan view of a portion of a mowing machine to which the invention is applied in the preferred form, with parts of the machine frame broken away to disclose the details of construction. Fig. 2 is a view similar to Fig. 1 but with the entire driving gear in section. Fig. 3 is a transverse sectional view through the clutch on a plane co-inciding with the forks of the clutch shifting device. Fig. 4 is a view similar to Fig. 1, showing the invention applied to a gear in which the gear clutch is shown equipped with means for operating it by hand.

The reference character 10 designates the main frame of a mowing machine, the frame being of the usual form and such portions only are shown as are necessary to support the parts immediately connected with my improved driving gear. The usual axle journaled in the main frame is designated by the reference character 11 and to this is secured the usual large driving gear 12 which meshes with spur pinion 13 keyed at 15 to countershaft 14 which is journaled in the usual housing extending rearwardly from that portion of the main frame surrounding the main axle 11, the counter shaft 14 being parallel with the axle. This housing, although preferably cast integral with the main frame, is designated by the reference character 16 and is preferably provided with an interior chamber as indicated at 17 for containing the gears. A suitable cover is usually provided for the gear chamber, the same not being shown as it forms no part of the invention. The housing or gear casing 16 is formed with bearings 18, 19, at each side thereof for supporting the countershaft 14, the walls of the housing or casing being usually extended outwardly or greatly thickened as shown in the drawing, to provide suitable elongated bearing surfaces for rotatably supporting the countershaft. The end of the countershaft 14, opposite the end to which is secured the driving pinion 13, may be secured adjacent its bearing against endwise movement by any suitable construction, as for example, the flanged bushing 20 sleeved over the end of the countershaft within the bearing 18 and being flanged at its outer end to provide a bearing portion, the bushing 20 being secured in position on the end of the shaft by any suitable retaining means, as for example, the threaded nut 21. Secured to the countershaft 14 on the interior gear casing or housing is a sleeve which closely surrounds countershaft 14 and extends lengthwise the width of the casing so that the ends of the sleeve bear against the casing walls adjacent the countershaft bearings 18, 19. This sleeve, which is cylindrical and is designated by the reference character 22, is secured to countershaft 14, preferably by transverse pins 14$^a$, 14$^b$, which pass through registering holes in countershaft and sleeve.

Secured to or preferably cast integral with the sleeve 22 at one end thereof is one member of a two-part clutch which extends outward from the periphery of the sleeve 22 as indicated at 22$^a$. The side wall of the clutch member 22$^a$ on the side toward the interior of the casing forms a bearing surface for taking the end thrust of one end of the hub of the large face gear 23, the other end of the hub of which extends to and abuts against the interior wall of the gear casing at the inner end of the bearing 19. By this construction the hub of the large driving gear 23 is retained against endwise movement on the clutch sleeve 22 but is mounted free to rotate thereon. The cylindrical hub of driving gear 23, affords a bearing for a second and sliding clutch member 24 provided with suitable teeth adapted to engage with suitable coöperating teeth on clutch member 22ª. The function of clutch member 24 is to lock driving gear 23, which is provided with a face gear in engagement with beveled pinion 25 secured to the end of pitman crank shaft 26 with clutch member 22ª and this is accomplished by slidably mounting clutch 24 on the hub of gear 23 so that the clutch teeth thereon may be caused at will to engage or disengage the teeth on clutch 22ª. To permit the clutch member 24 to have longitudinal movement on hub of gear 23 and yet prevent rotation relative thereto, one or more splines or keys are secured to the hub of driving gear 23 as indicated by the reference character 23ª. It is preferred that about four of such splines or keys are provided on the surface of the driving gear hub and cast integrally therewith, as shown in the drawings. The sliding clutch member 24 is provided with longitudinal grooves on its inner periphery so that it may be closely sleeved over the hub of driving gear 23, the said grooves coöperating with the splines or keys on the hub of the driving gear. A sliding clutch 24 is provided with a peripheral groove indicated at 24ª adapted to receive the two branches of a forked gear shifter indicated by the reference character 27, the said branches being shown at 27ª and 27ᵇ. When it is desired to apply my improved driving gear to a machine of the vertical lift type in which the driving gear is automatically shifted to render the cutting mechanism inoperative when the cutter bar is raised by the lifting mechanism out of its usual operative position, the gear shifter 27 which is pivoted at 28 to the gear casing of the machine frame may be provided with an integral arm as shown in dotted lines in Fig. 1 designated by the reference character 29 which is connected with and adapted to be operated by a longitudinally movable rod 30, which may be suitably connected with the cutter bar lifting mechanism in any old and well known manner not herein illustrated or described since the same forms no part of the invention. When my improved driving gear is desired to be used on a mowing machine that is not of the vertical lift type, the gear shifter fork 27 may be provided with suitable means for shifting the clutch by hand, as the hand lever indicated at 31 in Fig. 4.

For the purpose of more clearly showing the details of construction of both clutch members, the clutch members are shown separated so that the gear is inoperative to drive the machine in each of the several views. When the parts are so placed relative to each other it will be seen that although the main driving shaft 11 is constantly rotated from the driving wheels of the machine and the gear 12 on the driving shaft will be in constant operation and will constantly drive the spur gear 13, counter shaft 14, and clutch member 22ª secured thereto, yet when in the positions illustrated the clutch member 22ª will be free to rotate as will the sleeve 22 within the hub sleeve of driving gear 23 which latter will therefore remain stationary and its associated pitman crank shaft and cutting mechanism will remain inoperative. When, however, the gear shifter fork is moved either by the hand lever 31 or by the longitudinal movement of gear shifting rod 30 in the form shown in Fig. 1 the clutch 24 will be moved longitudinally on the hub of driving gear 23, sliding on the coöperating splines or grooves until it is caused to engage with the teeth of the constantly rotated clutch member 22ª and partaking of the constant movement of this clutch member it will, because of its sliding connection with the gear 23, impart movement thereto and to the cutting mechanism of the machine.

The advantages of the invention are due chiefly to the simplicity of construction and to the secure arrangement of the moving parts in relation to the gear casing and to one another within the gear casing. For example, it will be seen that the fixed clutch with its elongated sleeve 22 occupies the entire space between the inner ends of the bearings and countershaft 14 in the walls of the gear casing which construction absolutely prevents any longitudinal movement of the countershaft relative to the gear casing or parts associated therewith. Another advantage of my improved construction arises from the fact that the hub of the driving gear 23 instead of being sleeved directly on the countershaft to rotate thereon when the machine is out of gear is mounted on the enlarged sleeve portion 22 of the fixed clutch member. This construction gives the driving gear an enlarged bearing surface which decreases the relative wear and looseness eventually resulting from the use of the machine. Another advantage of this construction arises from the fact that the hub of the driving gear is almost in length the entire width of the gear casing, which strengthens the driving gear relative to its support on the countershaft and the hub on the driving gear, being closely confined between the inner end of the countershaft bearing and the shoulder adjacent the fixed clutch, looseness of the parts and consequent wear and noise are avoided. Another advantage of my improved construction arises from the fact that the engageable portions of both fixed and movable clutch members are enabled to be located almost midway between the center of countershaft 14 and the periphery of the driving gear 23 where the power must be applied to rotate the crank shaft and consequently the leverage or strain on the clutch members is relatively not so great as where they are located nearer the center of the countershaft. Furthermore, this construction by which the circumference of the clutch may be enlarged enables it to be constructed with a relatively larger number of coöperating or engaging teeth in its periphery, which makes the clutch quicker and surer in its operation.

In order that the invention might be understood, the details of the preferred embodiment have been shown and described but it will be apparent that those skilled in the art may vary from the same without departing from the purpose and spirit of the invention.

What I claim is—

1. In a driving gearing for harvesters, the combination with an axle, of a constantly rotated countershaft, means for imparting rotation from the axle to the countershaft, a sleeve secured to rotate with the countershaft, a fixed member of a two part clutch secured to said sleeve, a driven shaft, a pinion fixed to said shaft, a driving gear in constant engagement with said pinion and being provided with an elongated hub journaled to rotate on said clutch sleeve, and a clutch member secured to rotate with said driving gear and being mounted to have longitudinal movement on the said elongated hub thereof to engage or disengage the said fixed member of the two part clutch.

2. In a driving gearing for harvesters, the combination with an axle, of a constantly rotated countershaft, means for imparting rotation from the axle to the countershaft, a sleeve secured to rotate with the countershaft, a fixed member of a two part clutch secured to said sleeve, a driven shaft, a pinion fixed to said shaft, a driving gear in constant engagement with said pinion and being provided with an elongated hub journaled to rotate on said clutch sleeve, a clutch member secured to rotate with said driving gear and being mounted to have longitudinal movement on the said elongated hub thereof to engage or disengage the said fixed member of the two part clutch, and means for shifting the said movable clutch member.

3. In a driving gearing for harvesters, the combination with an axle, of a constantly rotated countershaft, means for imparting rotation from the axle to the countershaft, a sleeve secured to rotate with the countershaft, a fixed member of a two part clutch secured to said sleeve, a driven shaft, a pinion fixed to said shaft, a driving gear in constant engagement with said pinion and being provided with an elongated hub journaled to rotate on said clutch sleeve, a clutch member secured to rotate with said driving gear and being mounted to have longitudinal movement on the said elongated hub thereof to engage or disengage the said fixed member of the two part clutch, and means for controlling the said movable clutch member.

4. In a driving gearing for harvesters, the combination with an axle, of a constantly rotated countershaft, means for imparting rotation from the axle to the countershaft, a housing the walls thereof being provided with separated journal bearings for rotatably supporting the countershaft, a sleeve fixed to the countershaft, a fixed member of a two-part clutch secured to the sleeve, said sleeve extending longitudinally of the countershaft on the interior of the housing, the ends thereof abutting against the walls of the housing adjacent the inner ends of the countershaft bearings, a driven shaft, a pinion fixed to said shaft on the interior of the housing, a driving gear in constant engagement with said pinion and being provided with an elongated hub journaled to rotate on said clutch sleeve and extending longitudinally thereof with one end abutting against the wall of the casing adjacent a countershaft bearing and the other end abutting against a shoulder on the sleeve adjacent the fixed member of the two-part clutch, and a clutch member secured to rotate with said driving gear and being mounted to have longitudinal movement on the said elongated hub thereof to engage or disengage the said fixed member of the two-part clutch.

5. In a driving gearing for harvesters, the combination with an axle, of a constantly rotated countershaft, means for imparting rotation from the axle to the countershaft, a housing the walls thereof being provided with separated journal bearings for rotatably supporting the countershaft, a sleeve fixed to the countershaft, a fixed member of a two-part clutch secured to the sleeve, said sleeve extending longitudinally of the counter-shaft on the interior of the housing, the ends thereof abutting against the walls of the housing adjacent the inner ends of the countershaft bearings, a driven shaft, a pinion fixed to said shaft on the interior of the housing, a driving gear in constant engagement with said pinion and being provided with an elongated hub journaled to rotate on said clutch sleeve and extending longitudinally thereof with one end abutting against the wall of the casing adjacent a countershaft bearing and the other end abutting against a shoulder on the sleeve adjacent the fixed member of the two-part clutch, a clutch member secured to rotate with said driving gear and being mounted to have longitudinal movement on the said elongated hub thereof to engage or disengage the said fixed member of the two-part clutch, and means for shifting the said movable clutch member.

In testimony whereof I have signed my name to this specification, in the presence of two subscribing witnesses, on this 2nd day of May A. D. 1911.

JOHN H. DOWNING.

Witnesses:
H. W. DAVIS,
S. D. PORTER.

Copies of this patent may be obtained for five cents each, by addressing the "Commissioner of Patents, Washington, D. C."